United States Patent [19]

Onyszczuk

[11] Patent Number: 5,076,246
[45] Date of Patent: Dec. 31, 1991

[54] DEVICE FOR CONDITIONING OF LIQUID FUEL AND LIQUID COOLANT

[76] Inventor: Boleslaw Onyszczuk, ul.Marcinkowskiego 13, 66-300 Miedzyrzecz Wlkp., Poland

[21] Appl. No.: 550,513

[22] Filed: Jul. 10, 1990

[30] Foreign Application Priority Data

Mar. 29, 1989 [PL] Poland .................................. 278520

[51] Int. Cl.⁵ .......................................... F02B 75/00
[52] U.S. Cl. .................................. 123/538; 123/536
[58] Field of Search .................... 123/536, 537, 538

[56] References Cited

U.S. PATENT DOCUMENTS

| 3,349,354 | 10/1967 | Miyata | 123/536 |
|---|---|---|---|
| 3,989,017 | 11/1976 | Reece | 123/538 |
| 4,357,237 | 11/1982 | Sanderson | 123/538 |
| 4,414,951 | 11/1983 | Saneto | 123/536 |
| 4,461,262 | 7/1984 | Chow | 123/536 |
| 4,469,076 | 9/1984 | Wolff | 123/538 |
| 4,538,582 | 9/1985 | Wakuta | 123/536 |
| 4,572,145 | 2/1986 | Mitchell et al. | 123/536 |
| 4,711,271 | 12/1987 | Weisenbarger et al. | 123/538 |
| 4,808,306 | 2/1989 | Mitchell et al. | 123/538 |

FOREIGN PATENT DOCUMENTS

| 0153850 | 12/1980 | Japan | 123/538 |
|---|---|---|---|
| 0131693 | 7/1984 | Japan | 123/538 |

Primary Examiner—Andrew M. Dolinar
Assistant Examiner—M. Macy
Attorney, Agent, or Firm—Ladas & Parry

[57] ABSTRACT

A device for simultaneously conditioning liquid fuel and liquid coolant in an engine or the like. The device comprises a cylindrical body. A set of annular magnets are positioned concentrically and axially in the body. The magnets are separated by ferromagnetic annular internal pole shoes into pairs. Every pair of the magnets are mounted between two adjacent internal pole shoes and placed with monomial poles facing each other. External pole shoes are situated concentrically around the corresponding internal pole shoes. A fuel conditioning circuit in the form of non-magnetic conduit is mounted between the internal and external pole shoes. A coolant conditioning circuit is formed between the inner surface of the body having the external pole shoes thereon and the assembly of the magnets and the internal pole shoes. The fuel conduit is a spiral pipe with odd number of coils or a concentrically located pipe filled with a bed of ferromagnetic fillings on which the magnetic field of the magnets acts.

6 Claims, 2 Drawing Sheets

DEVICE FOR CONDITIONING OF LIQUID FUEL AND LIQUID COOLANT

The subject of the present invention is a device for simultaneously conditioning liquid fuel and liquid coolant, applied especially to improve operation of internal combustion-, carburettor- or compression-ignition engines, as well as oil and gas burners.

Those skilled in the art know from the Polish patent specification no. 114283 that a device for conditioning liquids by means of magnetic field consists of a cylindrical housing or a ferromagnetic body in which a ferromagnetic roll is axially situated and surrounded by a set of annular magnets. Those magnets are separated and into a whole by means of ferromagnetic internal and central pole shoes and external pole shoes situated in their planes and adhered to the internal surface of the cylindrical body Sections of pole shoes are similar to the section of the rivet whose neck sets the distance between two adjacent magnets.

The known devices designed for conditioning liquids comprise sets of magnets, which in most cases are permanent magnets, arranged along the channel of the liquid such as water, so that magnetic flux lines of particular magnetic circuits are perpendicular to the flowing direction of the liquid. From the specification of the Polish patent application no. P264 entitled "Method and device for purification of liquids in magnetic field" a method of water treatment and conditioning is known. The said method consists of passing the liquid through zones of different flowing velocities, different velocity gradients, different internal pressure gradients and different gradients and intensities of the magnetic field. The device according to this Polish patent application consists of a filter bed of packings having ferromagnetic properties and being suspended in the magnetic field generated by a set of arc magnets. The magnets are situated circumferentially around a metal tank having dia- or paramagnetic properties. The said magnets have magnetic poles on the concave and convex side of the arc and two of them are situated side by side with their monomial poles. Thus, pairs are formed with their unlike poles.

Those skilled in the art know from German patent specification DE 3403797 a method of fuel combustion in an internal combustion engine and a device designed for that method. In that German patent, fuel presented in the fuel system of an internal combustion engine is subject to the effect of magnetic field. Owing to the improvement of combustion, specific fuel consumption can be reduced. The fuel system of the internal combustion engine for the method comprises fuel feeding devices, a device for supplying fuel to at least one cylinder, and pipes constituting fuel paths. The fuel flowing from the feeding device to the supplying device and then into the engine is subject to the effect of magnetic field.

From German patent specification DE 2256379 a method of scattering liquid fuels by means of flux of magnetic field and interrupting action is known. Interaction of the magnetic field on fuel particles causes their charging and then their disintegration into microscopic, almost imperceptible petrol droplets. In the result thereof, combustion proceeds without any remainders, i.e., without production of toxic substances Owing to operation of the device according to the aforesaid patent, the finest particles should be transformed into complete gasification in the result of continuous influence of intermittent magnetic fields.

From the Polish patent application P-273505 there known a method of improving the efficiency of an internal combustion engine and device for conditioning liquid coolant and fuel for the internal combustion engine. According to the said patent application the method of improving the efficiency of both a carburettor engine and a compression-ignition engine by conditioning of liquid coolant and fuel, in which liquid coolant and fuel are subject to concurrent conditioning by means of magnetohydrodynamic method, consists of passing both these agents through a zone of the same magnetic field having the intensity of maximum about $2.8 \times 10^5$ A/m, magnetic field gradient of about $10^7$ A/m$^2$ and velocity gradients in contractions. The magnetohydrodynamic treatment is conducted with simultaneously heating the fuel by the heat given up by liquid coolant. Besides, during magnetohydrodynamic treatment the flowing direction of the agents being treated changes in relation to the direction of magnetic flux lines.

The object of the present invention is to improve operation of an internal combustion engine, to reduce fuel consumption and to protect the environment.

This object has been achieved by designing a device for simultaneous conditioning of liquid fuel and liquid coolant. The device comprises a body incorporating a set of permanent magnets separated by internal pole shoes. The internal pole shoes are placed opposite to external pole shoes abutted to the inner surface of the body. Said body comprises a liquid fuel conditioning circuit and a liquid coolant conditioning circuit.

A liquid fuel feeding conduit can be filled with a bed of ferromagnetic fillings on which magnetic field of the permanent magnets act.

An advantage of the invention is the simultaneous conditioning of two liquids by utilizing additional heat exchanged between the liquids.

According to the present invention, it is possible to condition liquid coolant and liquid fuels at the same time, as well as to condition engine fuels by simultaneously reheating the fuel with the heat given up in the process of engine cooling.

In the conditioning process of liquids and gases, permanent magnets are used for generating a magnetic field of flux density of at least 2000 gausses.

The subject of the present invention is shown as examples of its embodiment in the drawings, in which:

FIG. 1 presents a longitudinal section of a device with a spiral fuel conduit for conditioning liquid fuel and liquid coolant;

Figure 1:
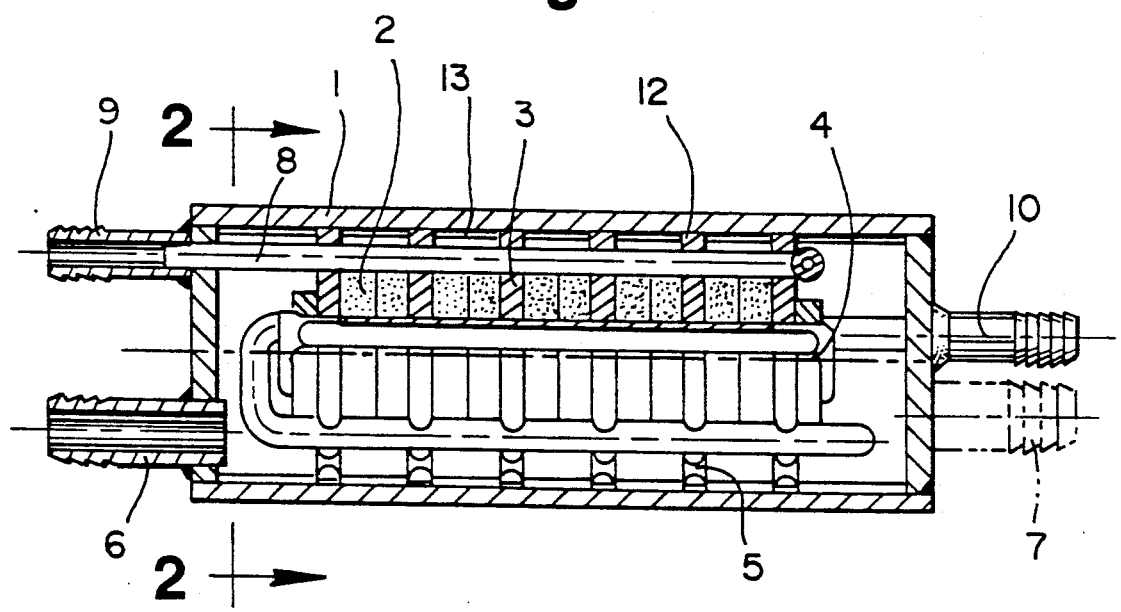
Figure 2:
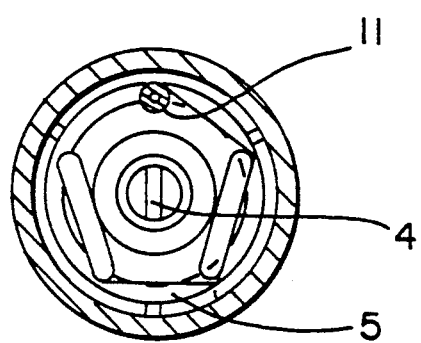
FIG. 2 is a sectional view of the device of FIG. 1 along line A—A marked in FIG. 1.

The device of FIGS. 1 and 2 comprises a cylindrical body 1 incorporating a set of concentrically and axially arranged annular permanent magnets 2 which are separated by ferromagnetic annular internal pole shoes 3 and connected by a brazen arbor or tube 4, wherein adjacent magnets are placed with monomial poles facing each other In order to increase the value and the gradient of the magnetic flux density, external pole shoes 12 are applied and situated opposite to the internal pole shoes 3 and abutted to the inner surface of the body 1 The body has two built-in independent flowing circuits for agents to be conditioned. The liquid coolant circuit is channels 5 between the wall of the body 1 and the set of magnets 2 with internal pole shoes 3 and connected by a liquid coolant feeding stub pipe 6 and a drain stub pipe 7 of said liquid coolant The fuel or gas circuit is formed by a paramagnetic or diamagnetic conduit 8 which is a coil pipe with odd numbers of coils The fuel conduit 8 is situated outside of the set magnets 2 and the internal pole shoes 3 and in recesses 11 of said internal pole shoes 3 as shown in FIG. 2 The fuel conduit 8 is terminated or connected with a fuel supply stub pipe 9 and a fuel drain stub pipe 10. The spiral or coil shape of the pipe or fuel conduit 8 enables multiplication of the number of remagnetizations of flowing fuel. The external pole shoes 12 are designed in such a way that they are in form of rings with a cross-section of half-ellipse. The external pole shoes 12 are placed opposite to the internal pole shoes 3 and welded to the body 1 or suspended on distanoe ribs 13. As shown in FIG. 2, ferromagnetic pole shoes 3 are in the form of disks having recesses 11 arranged symmetrically on the perimeters of said pole shoes 3. The recesses 11 are adapted to mount the spiral fuel conduit 8.

Figure 3:
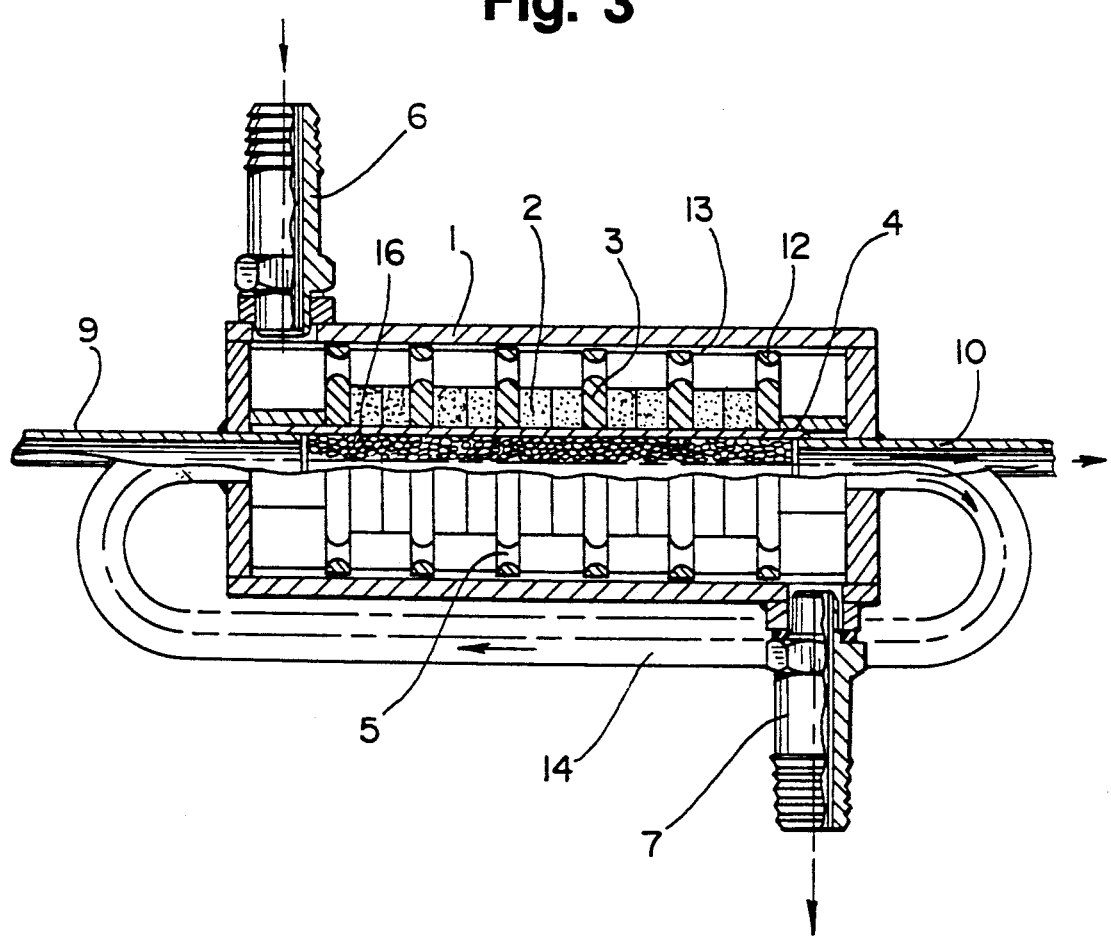
FIG. 3 is a second example of the embodiment of the device of FIG. 1 with a concentric fuel conduit situated in the axis of the device and filled with a bed of ferromagnetic fillings.

The second example of the embodiment of the present invention is shown in FIG. 3. A fuel conduit 14 made of a non-magnetic material is situated concentrically in the axis of the device and is filled with a bed of packings 16 having ferromagnetic properties, preferably steel fillings. Those fillings 16 are suspended in the magnetic field of the annular permanent magnets 2 and mounted concentrically in the conduit 14.

Fuel passes through zones of different intensities of the magnetic field and of different gradients of this field, with its changing velocity, gradient of the velocity and internal pressures. The said different parameters are obtained owing to the influence of heterogenity of the magnetic field on the zones corresponding to the packings or fillings 16 of ferromagnetic properties and of different dimensions and shapes as they are stochastically arranged in relation to one another. In the slots formed within the packings, depending on the shape and contact area of these packings, high intensity of magnetic field is obtained even up to $2 \times 10^5$ A/m. In the slots of high flow velocity and low internal pressure fuel degassing proceeds quickly; while in the slots of low flow velocity and high intensity of magnetic field gas particles stop and accumulate into bubbles and are entrained by the fuel flow.

In the external zone of the cooling water flow there is also an influence of magnetic field with variable intensity and variable gradients of this intensity.

These two systems, as of independent flows of fuel and water, gas and water, cooling air and fuel, cooling air and gas, form at the same time a common hybrid system for conditioning of liquid and gas by the magnetic field. The device does not require any additional filter on the liquid coolant circuit.

An advantage of the solution according to the invention is almost 100% efficiency of cleaning the cooling system from boiler scale with the application of water as a coolant and at least 5% fuel efficiency or gas saving, depending on the type of the engine, the burner and the fuel.

The device may be included in the cooling system and the feeding system in internal combustion or gas engines. During their operation the flowing liquid coolant and fuel are subject to simultaneous magnetohydrodynamic influence. Since processes of conditioning the liquids by magnetic field proceed most effectively according to practical tests at the temperature of 70-90°, it should be recognized that in hybrid action the temperature of liquid coolant, fuel and gas is of essential importance. In the said process of the liquid coolant, polymers with surface activity are formed, which cause removal of impurities from the cooling system, especially boiler scale. Moreover, the whole cooling system for improving the engine operation is protected against corrosion.

As the result of the influence of the magnetic field and the heating, great amount of fine air bubbles with double layers are produced in the fuel. The fuel polymers are put in order. This process intensifies the result of the flowing fuel at various velocities in zones of variable gradients of the magnetic field intensity. As the result of production of linear polymers, they will be broken up in the process of spraying the fuel in the carburettor. A change of the structure of the hydrocarbon chains under the effect of applying the treatment with the magnetic field will improve antiknock properties of the fuel, i.e. will raise the octane number.

The application of the device according to the invention enables to improve the efficiency of the cooling system in almost 100% thereby protecting the system against corrosion, and enables to reduce the fuel consumption by at least 5%, depending on the type of the carburettor engine or compression-ignition engines and to reduce the fuel combustion at idle running of the engine. It also increases the engine idling speed at an adjustment by about 10% and improves the acceleration and the maximum speed of the vehicle further it ensures steady running of the engine immediately after cold starting, i.e. considerably better starting at low temperature and considerably quicker and smoother reaching of high engine speed at low temperatures and under load. Moreover, it reduces the deposit on electrodes of the spark plugs and the emission of black smoke from the exhaust pipe, especially at a cold engine thereby considerably prolonging the service life of the exhaust system, e.g. emission of toxic substances such as $CO$, $CO_2$, nitric oxide and hydrocarbons in exhaust gases. Improvement of the combustion of carcinogenic benzene in lead-free petrol will considerably prolong the catalysts life owing to the better combustion of the fuel and completely eliminate or considerably reduce the engine clashing by virtue of increasing the octane number of the fuel when low-octane or lead-free petrol is used. When used in turbo-diesel engines, gelation temperature in adjacent zones of the device at cold starting of the engine varies from $-14°$ C. to $-18°$ C., improved operation of the combustion. Besides, the application of the device does not require any additional electric energy.

The device according to the invention as presented in FIGS. 1-3 is widely applicable in motorization and heating installations, in sea navigation, refrigerating, engineering and so on.

I claim:

1. A device for simultaneously conditioning both liquid fuel and liquid coolant, comprising a cylindrical body; a set of annular permanent magnets being concentrically and axially arranged in said body; a plurality of annular ferromagnetic internal pole shoes adapted to separate the set of the permanent magnets into pairs and concentrically placed in the body; a plurality of annular external pole shoes placed around said internal pole shoes, each of said external pole shoes being opposite to each of said corresponding internal pole shoes; a liquid fuel conditioning circuit and a liquid coolant conditioning circuit provided in said body; wherein each pair of said magnets are mounted between the adjacent internal plate shoes and have monomial poles facing each other.

2. The device according to claim 1 wherein said liquid fuel conditioning circuit is a non-magnetic spiral conduit having an odd number of coils and being arranged between the internal and the external pole shoes.

3. The device according to claim 2 wherein said fuel conduit is mounted within recesses formed symmetrically on the perimeters of said internal pole shoes.

4. The device according to claim 1, wherein said liquid coolant conditioning circuit is constituted by channels between the inner surface of the body and the internal pole shoes and between the external and internal pole shoes.

5. The device according to claim 1, wherein said external pole shoes have cross-section of half ellipse.

6. The device according to claim 1, wherein said liquid fuel conditioning circuit is a non-magnetic conduit situated concentrically and axially in the body and filled with a bed of ferromagnetic fillings subject to act under the heterogeneous magnetic field of the permanent magnets.

* * * * *